United States Patent Office 3,783,112
Patented Jan. 1, 1974

3,783,112
MANUFACTURE OF SEBACIC ACID DIESTERS
Fritz Beck, Ludwigshafen, Juergen Haufe, Lambsheim, and Heinz Nohe, Ludwigshafen, Germany, assignors to Badische Anilin- & Soda-Fabrik Aktiengesellschaft, Ludwigshafen (Rhine), Germany
No Drawing. Filed May 10, 1971, Ser. No. 142,043
Claims priority, application Germany, May 12, 1970, P 20 23 080.2
Int. Cl. C07b 29/06; C07c 67/00, 69/50
U.S. Cl. 204—59 R                       7 Claims

ABSTRACT OF THE DISCLOSURE

Process for the production of sebacic acid diesters from adipic acid monoesters of higher alcohols by electrochemical condensation in methanolic solution using continuous or intermittent flow of current, in which a saturated mono- or polyvalent ether or a lower alkanoic acid is added to the reaction mixture.

---

This invention relates to the electrochemical condensation of adipic acid monoesters of higher alcohols to sebacic acid diesters.

When the Kolbe reaction of adipc acid monoesters containing higher alcohol radicals is carried out under the conditions accepted as optimum conditions for monomethyl adipate, considerable difficulties are encountered during electrolysis. These difficulties are caused by the formation of a polymeric deposit on the platinum anode. This is accompanied by an increase in the cell potential, and consequently no steady state is reached. The higher the alcohol radical in the monoester, the more pronounced does this effect become. According to Belgian Pat. 723,694 this difficulty is overcome by periodically interrupting the flow of current through the electrolytic cell, but this alone is not sufficient to prevent a slow rise in the cell potential during long continuous runs.

We have now found that the rise in potential may be restricted or prevented, in the manufacture of sebacic acid diesters from adipic acid monoesters of higher alcohols by electrochemical condensation in methanolic solution with a continuous or intermittent flow of current, by additionally incorporating in the reaction solution (a) a saturated mono- or poly-valent aliphatic ether or a saturated cyclic ether or diether in a concentration of from 5 to 40% by weight of the total weight of the reaction mixture, and/or
(b) a lower alkanoic acid in a concentration of from 0.1 to 2% by weight of the total weight of the reaction mixture.

Suitable adipc acid monoesters of higher alcohols are monoesters of adipic acid with primary or secondary straight-chain or branched-chain aliphatic alcohols of from 4 to 12 and preferably of from 6 to 10 carbon atoms, for example monobutyl, mono-isobutyl, mono-2-butyl, monopentyl, monohexyl, monocyclohexyl, mono-octyl, mono-(2-methylhexyl-5), mono(2-ethylhexyl), monodecyl and monododecyl adipates.

Suitable saturated mono- or poly-valent aliphatic ethers are those having from 4 to 8 carbon atoms, for example diethyl ether, di-isopropyl ether, diglycoldimethyl ether and diglycoldiethyl ether, and suitable saturated cyclic ethers or diethers are for example tetrahydrofuran, tetrahydropyran and dioxane.

The ethers are added to the reaction solution in a concentration of from 5 to 40%, preferably from 10 to 30%, by weight of the total reaction mixture.

Lower alkanoic acids used are those having from 2 to 4 carbon atoms, such as acetic acid, propionic acid and butyric acid, the use of acetic acid being particularly advantageous. These mono-carboxylic acids are added to the reaction mixture in a concentration of from 0.1 to 2 and preferably from 0.5 to 1.5% by weight of the total weight of the mixture.

We particularly prefer to add from 10 to 30% by weight of tetrahydrofuran and/or from 0.5 to 1.5% by weight of acetic acid.

When carrying out the process of the invention it is usual to start from a 20 to 50 and preferably a 30 to 40% w./w. solution of the adipic acid monoester in methanol, to which the saturated mono- or poly-valent aliphatic ether, the saturated cyclic ether or diether and/or the lower alkanoic acid are added in the amounts specified.

The acid reacting mixture is partially neutralized to provide the necessary conductivity in the electrolytic system. To this end, basifying compounds such as sodium bicarbonate, sodium carbonate or sodium methylate are used. That molar portion of the adipic acid monoester which is neutralized is referred to as the "degree of neutralization." It is from 1 to 30 and preferably from 2 to 15% molar.

Condensation is carried out at current densities of from 5 to 50 and preferably from 20 to 30 amps/dm.$^2$. This results in cell potentials varying from 10 to 30 and generally from 11 to 19 volts depending on the conditions.

Optimum results are achieved at high current densities and low degrees of neutralization.

The temperature of the reaction mixture is usually maintained at from 20° to 65° C. and preferably from 30° to 55° C. The upper limit is set by the boiling point of methanol, which is the commonly used solvent in Kolbe reactions.

In addition to the measures described above, the normally continuous flow of current may be interrupted periodically. Such interruptions cause further reduction of the cell potential by from 1 to 2 volts. The breaks usually have a duration of from one hundredth to one half of the periods of current flow. For example, periods of current flow of from 1 to 30 minutes may be followed by breaks of from 2 to 60 seconds, during which no current flows.

Particularly suitable anodes are smooth platinum anodes. Alternative anode materials, however, are platinum-rhodium, platinum-iridium, gold, gold/platinum alloys such as 90:10 gold/platinum, platinized titanium or tantalum, or gold-plated titanium or tantalum. Requirements are less exacting as regards the cathode material, which may be platinum, refined steel, nickel or titanium for example.

Preferably, the reaction is carried out using the cell described in Belgian Pat. 723,694 and having vibrating pairs of electrodes which are permeable to liquids. Alternatively, the reaction may be carried out in cells which vibrate and have one permeable and one impermeable electrode or which have two impermeable electrodes and do not vibrate.

Working up of the reaction mixture is a simple matter. The solvent mixture is conveniently removed from the reaction mixture by distillation, if necessary after neutralization of the unreacted half-ester. Distillation is preferably carried out in a falling film evaporator. The sodium salt of the unreacted half-ester is washed from the residue, for example with water. The sebacate and by-products remaining in the organic phase are separated either by distillation, for example steam distillation, or by freezing out the sebacate and filtering. Alternatively, the mixture remaining after distillation of the residue may be separated by filtering off the precipitated salt, freezing out the sebacate from the filtrate and separating the unreacted half-ester of adipic acid and the by-products by fractional distillation. The purity of theh product may be checked by gas chromatography and with reference to the ester number.

The rate of conversion of the half-ester in the process of the invention is very high, generally at or above 90%.

The yields of sebacic acid diester are from 60 to 75% and the current efficiencies attained are from 40 to 50% of theory.

The process of the invention make sebacic acid diesters of higher alcohols readily available by direct synthesis and with reasonable energy consumption. Using our novel process, the characterizing features of which may be used singly or in combination, the electrochemical synthesis of higher sebacic acid diesters may be carried out in a large scale without difficulty. No organic deposit of any kind is formed on the anode and thus no rise in potential occurs during electrolysis. Indeed, in many cases the cell potential falls during electrolysis, although a comparatively non-polar product is accumulated, whilst the cell potential rises during conventional processes, which rise may be more than 100% of the initial value of the potential.

The process may also be carried out continuously at high concentrations of product and low concentrations of the acid to be electrolyzed at low loss of yield and without the potential rinsing. Thus, the anodic oxidation of the product does not affect performance, i.e. despite the low concentration of starting materials, they are preferentially converted at the electrodes. The reaction is even successful using adipic acid monoesters of commercial grade containing from 0.1 to 10% of adipic acid diester and from 0.1 to 10% of esterification alcohol as impurities.

The sebacic acid diesters produced by the process of the invention may be advantageously used as lubricants, so-called ester oils, and as specialty plasticizers.

EXAMPLE 1

A solution of 300 g. of mono(2-ethylhexyl) adipate in 500 g. of methanol and 200 g. of tetrahydrofuran is adjusted to a degree of neutralization of 15% with sodium methylate and electrolyzed in a cell having vibrating electrodes permeable to liquids such as is described in Belgian Pat. 723,694, at 42° C. and a current density of 25 amps/$dm^2$. The potential rises from 14.0 volts at the commencement of electrolysis to 15.5 volts at its termination. After 130% of the theoretically required amount of current has passed through the cell, the mixture is worked up as follows: to neutralize the unreacted half-ester normal aqueous caustic soda is added, and the solvents are then distilled off. The sodium salt of the half-ester is extracted from the residue with water, and the sebacic acid diester is further freed from by-products by steam distillation at 20 mm. of Hg and 130° C. The purity of the resulting product, di(2-ethylhexyl) sebacate, is checked by gas chromatography and with reference to the ester number. There are obtained 150 g. of 91% pure di(2-ethylhexyl) sebacate, equivalent to a yield of 71% and a current efficiency of 50%. The conversion of half-ester is 91%.

If the same experiment is carried out without the addition of tetrahydrofuran, the cell potential rises during electrolysis to over 30 volts. The yield drops to 62.7% and the current efficiency to 43.2%. On completion of electrolysis, the platinum gauze is seen to have a coating of a gray polymeric deposit.

EXAMPLE 2

A solution of 350 g. of mono(2-ethylhexyl) adipate in 650 g. of methanol is electrolyzed under the conditions stated in Example 1 without the addition of tetrahydrofuran but with the addition of 7.5 g. of glacial acetic acid. The cell potential is 15 to 16 volts. Sebacic acid diester is obtained in a yield of 69% at a current efficiency of 47%. When the amount of acetic acid is raised to 20 g., the cell potential is improved to 13 volts but the yield drops to 60% and the current efficiency to 38%.

EXAMPLE 3

400 g. of mono(2-ethylhexyl)adipate in solution in 500 g. of methanol containing 10% of dioxane are neutralized with anhydrous sodium carbonate to 80% and converted in the manner described in Example 1 at a current density of 20 amps/$dm^2$. In this experiment the cell potential is 16 volts. The reaction mixture is worked up to give a yield of 70% at a current efficiency of 49%.

EXAMPLE 4

A solution of 300 g. of mono(2-ethylhexyl) adipate in 500 g. of methanol and 200 g. of tetrahydrofuran is adjusted to a degree of neutralization of 10% with sodium methylate, 10 g. of glacial acetic acid are added and the mixture is electrolyzed and worked up in the manner described in Example 1. The cell potential is 14 to 14.5 volts. The yield is 72% and the current efficiency 50%.

If the experiment is repeated but the flow of current through the cell interrupted for 15 seconds at intervals of 10 minutes, the cell potential remains constant at 14.0 volts, whilst the same yield of 72% is achieved.

EXAMPLE 5

A solution of 350 g. of mono(2-butyl) adipate in 550 g. of methanol and 100 g. of tetrahydrofuran, neutralized to 10% with sodium methylate, is electrolyzed and worked up under the conditions described in Example 1. There are thus obtained 187 g. of 89% pure di(2-butyl) sebacate. This is equivalent to a yield of 74% and a current efficiency of 52%. The cell potential falls during electrolysis from 19 volts at its commencement to 11.5 volts at its termination.

EXAMPLE 6

Electrolysis is carried out in the cell described in Example 1 but provided with an inlet and outlet for continuous operation.

Initially, 1 kg. of 10.7 kg. of electrolyte consisting of 27% by weight of mono(2-ethylhexyl) adipate. 3% by weight of the sodium salt of 2-ethylhexyl adipate, 10% by weight of tetrahydrofuran, 59% by weight of methanol and 1% by weight of acetic acid is electrolyzed at a current of 8 amps to a conversion of 90%. During this electrolysis, the flow of current is interrupted for periods of 15 seconds at intervals of 10 minutes. When the said conversion has been reached, the remainder of the electrolyte is fed to the cell at a rate such that a constant conversion rate of 90% is maintained. The electrolysis is carried out for a total period of 45 hours, during which the cell potential remains between 14 and 15 volts. The reaction mixture is worked up to give 1.54 kg. of 91% pure di(2-ethylhexyl) sebacate, equivalent to a yield of 65% and a current efficiency of 45% of theory.

We claim:

1. In a method for the production of sebacic acid diester from adipic acid monoesters of high alcohols of 4 to 12 carbon atoms by electrochemical condensation in methanolic solution using a continuous or intermittent flow of current at current densities of from 5 to 50 amps/$dm^2$, the improvement which comprises adding to the reaction mixture at least one compound selected from the group consisting of a saturated cyclic ether having from 4 to 8 carbon atoms, a saturated cyclic diether having from 4 to 8 carbon atoms and a lower alkanoic acid having from 2 to 4 carbon atoms, the amount of saturated ether and/or diether being from 5 to 40% by weight of the total weight of the reaction mixture and the amount of lower alkanoic acid being from 0.1 to 2% by weight of the total weight of the reaction mixture.

2. A process as claimed in claim 1 wherein tetrahydrofuran is used as the saturated cyclic ether.

3. A process as claimed in claim 1 wherein dioxane is used as the saturated cyclic ether.

4. A process as claimed in claim 1 wherein acetic acid is used as the lower alkanoic acid.

5. A process as claimed in claim 1 wherein there are incorporated in the reaction solution from 10 to 30% of tetrahydrofuran and from 0.5 to 1.5% of glacial acetic acid.

6. In a method for the production of sebacic acid diester from adipic acid monoesters of higher alcohols of 4 to 12 carbon atoms by electrochemical condensation in methanolic solution using a continuous or intermittent flow of current at current densities of from 5 to 50 amps/dm.$^2$, the improvement which comprises adding to the reaction mixture a saturated cyclic ether or saturated cyclic diether, said ether or diether having from 4 to 8 carbon atoms in a concentration of from 5 to 40% of the total weight of the reaction mixture.

7. A process as claimed in claim 10 wherein a lower alkanoic acid is also added in a concentration of from 0.1 to 2.0% of the total weight of the reaction mixture.

References Cited

UNITED STATES PATENTS 3,652,430  3/1972  Beck et al. _____ 204—59 R

FOREIGN PATENTS 1,802,865  9/1970  Germany _____ 204—2
880,289  6/1953  Germany _____ 204—59 R FREDERICK C. EDMUNDSON, Primary Examiner